UNITED STATES PATENT OFFICE.

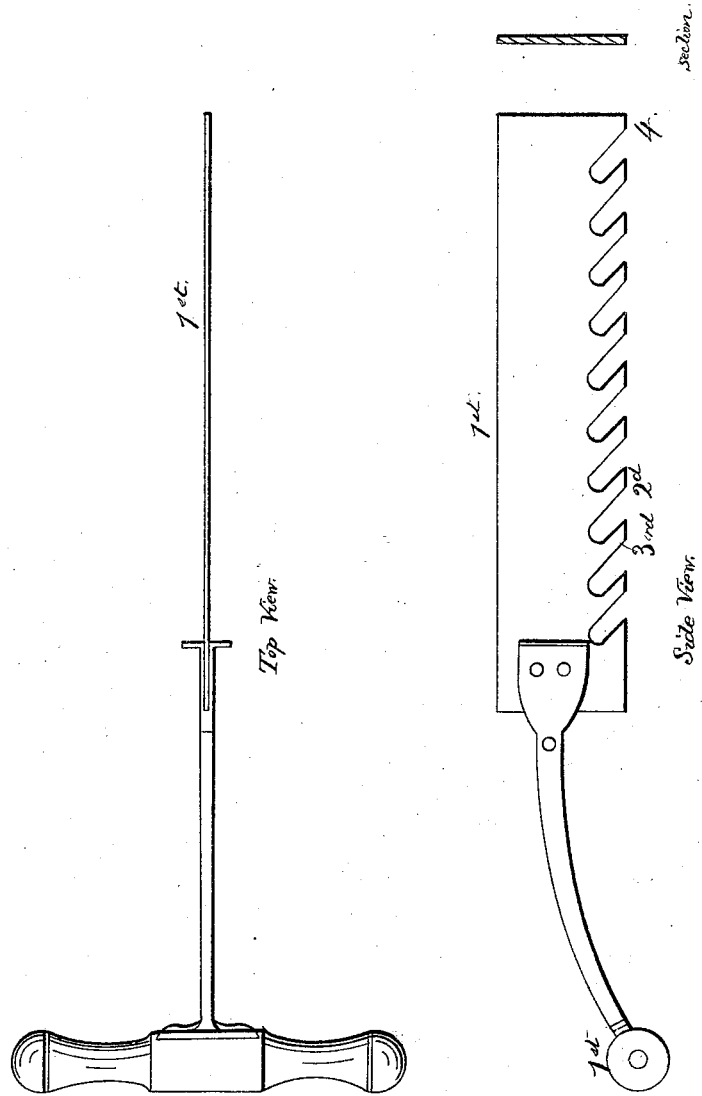

JOHN BARKER, OF CAMBRIDGE, MASSACHUSETTS.

SAW FOR SAWING ICE.

Specification of Letters Patent No. 590, dated February 3, 1838.

*To all whom it may concern:*

Be it known that I, JOHN BARKER, of Cambridge, in the county of Middlesex and State of Massachusetts, have invented a new and useful Improvement in Saws Commonly Used Heretofore for Sawing Ice; and I do hereby declare that the following is a full and exact description.

The nature of my improvement consists in the peculiar form in which the teeth of this ice saw are cut by means of which the saw is driven forward with more ease and accomplishes more work with less power than any saw heretofore used for cutting ice.

To enable others skilled in the art to make and use my improvement aforesaid I will proceed to describe its construction and operation. First. The handle and plate (1st of accompanying drawings) of this saw may be of the kind in common use. Second. Each tooth should be so cut as to give on the front edge of it (2nd of accompanying drawings) an angle of about forty five degrees with the back of the plate the inclination being from the point toward the handle. The rear of each tooth (3rd of accompanying drawings) should be cut at an angle somewhat greater than the front and each tooth is to be at the extreme point of the front edge about one eighth of an inch longer than the extreme point of the rear edge thereof measuring in a perpendicular line from the back of the plate; each tooth is to be about three inches in length and from the termination of the back edge to the termination of the front edge is to be about three quarters of an inch in width. The object in making the front edge of each tooth longer than the rear edge is to enable the front edge of each tooth to act as a chissel in cutting into the ice while the rear part serves as a shoulder to prevent the tooth next succeeding from sinking into the ice to a greater depth than the difference between the length of the two edges at each forward motion of the saw. By increasing the difference between the length of the front and rear edges of each tooth a greater cut may be obtained and vice versa. Third. At the end of the saw is an imperfect tooth (4) having the rear edge like the rear edges of the other teeth to serve as a shoulder to the next succeeding tooth, but without possessing a cutting edge like the other teeth. The line from the front edge of said tooth to the back of the saw being a perpendicular line. The front edge of each tooth is to be thicker than its rear edge by about one eighth part so as to enable the saw to pass more freely through the ice.

What I claim as my invention is—

The peculiar formation and construction of the teeth of the saw above described. This saw is worked by hand in the usual manner.

JOHN BARKER.

Witnesses:
JAMES W. FENNO,
ELISHA BURBANK,